United States Patent [19]
Klaassen et al.

[11] Patent Number: 5,818,656
[45] Date of Patent: Oct. 6, 1998

[54] CIRCUITRY FOR CORRECTION OF THERMAL TRANSIENTS IN THE ANALOG SIGNAL FROM A MAGNETORESISTIVE SENSOR

[75] Inventors: Klaas Berend Klaassen, San Jose; Richard James Reay, Mountain View, both of Calif.

[73] Assignee: International Business Machines Corporation, Armonk, N.Y.

[21] Appl. No.: 614,124

[22] Filed: Mar. 12, 1996

[51] Int. Cl.[6] .................................................. G11B 5/02
[52] U.S. Cl. ........................................ 360/67; 360/55
[58] Field of Search .................... 360/67, 55, 46

[56] References Cited

U.S. PATENT DOCUMENTS

| | | | |
|---|---|---|---|
| 4,914,398 | 4/1990 | Jove et al. | 360/46 X |
| 5,057,785 | 10/1991 | Chung et al. | 360/67 X |
| 5,233,482 | 8/1993 | Galbraith et al. | 360/46 |
| 5,367,409 | 11/1994 | Ottesen et al. . | |
| 5,420,736 | 5/1995 | Heim et al. . | |
| 5,497,111 | 3/1996 | Cunningham | 327/58 |

OTHER PUBLICATIONS

Chung et al., "Prefiltering in the Design of Peristaltic Envelope Detectors," IBM TDB vol. 33 No. 10B, Mar. 1991, pp. 48–52.

R. Anderson et al., "Balanced Resistance Magnetoresistive Head Compensated Against Thermal and Piezoresistive Effects", IBM Technical Disclosure Bulletin, vol. 17, No. 11, Apr. 1975, pp. 3478–3480.

S. D. Cheatham et al., "Self–biased, Noise–free Magnetoresistive Head", IBM Technical Disclosure Bulletin, vol. 17, No. 7, Dec. 1974, p. 1862.

R. E. Fontana, Jr., et al., "Disk Asperity Detector", IBM Technical Disclosure Bulletin, vol. 26, No. 3A, Aug. 1983, pp. 1278–1280.

(List continued on next page.)

*Primary Examiner*—Stuart S. Levy
*Assistant Examiner*—James L. Habermehl
*Attorney, Agent, or Firm*—Thomas R. Berthold

[57] ABSTRACT

Thermal transient signal detection/correction circuitry corrects for errors caused by actual thermal asperities and baseline wander in the analog signal from a magnetoresistive (MR) sensor, such as an MR read head in a magnetic recording disk drive. In a disk drive with an MR head the detection/correction circuitry is located between the MR head signal amplifier and the data readback channel so that the thermal transients are corrected in the analog data signal prior to processing of the analog data signal into digital data. A detection circuit receives the analog data signal from the MR head, low-pass filters the signal and generates a thermal asperity event signal if the filtered signal exceeds a predetermined threshold. A correction circuit also receives the analog data signal from the MR head and includes a high-pass filter whose pole frequency is controlled by the thermal asperity event signal from the detection circuit. In the event of a detected thermal transient the pole frequency is quickly raised to bring the baseline of the analog data signal back to normal, which turns off the output of the detection circuit. The correction circuit then lowers the pole frequency gradually. The thermal transient detection/correction circuit thus quickly restores the baseline of the analog data signal to zero, quickly enables data to be read after the onset of a thermal transient and eliminates undershoot in the analog data signal due to the slowly changing tail of the thermal transient.

29 Claims, 13 Drawing Sheets

OTHER PUBLICATIONS

R. L. Galbraith et al., "Magneto–resistive Head Thermal Asperity Digital Compensation", IEEE Transactions on Magnetics, vol. 28, No. 5, Sep. 1992, pp. 2731–2732.

K. B. Klaassen, "Magnetic Recording Channel Front–ends", IEEE Transactions on Magnetics, vol. 27, No. 6, Nov. 1991, pp. 4503–4508.

K. B. Klaassen et al., "Read/Write Amplifier Design Considerations for MR Heads", IEEE Transactions on Magnetics, vol. 31, No. 2, Mar. 1995, pp. 1056–1061.

C. C. Lin et al., "Resistance Matching for Coupled–film Magnetoresistive Elements", IBM Technical Disclosure Bulletin, vol. 17, No. 11, Apr. 1975, p. 3437.

D. A. Nepela et al., "Resistive Element for Bias and Noise Cancellation of Magnetoresistive Head", IBM Technical Disclosure Bulletin, vol. 17, No. 9, Feb. 1975, pp. 2759–2760.

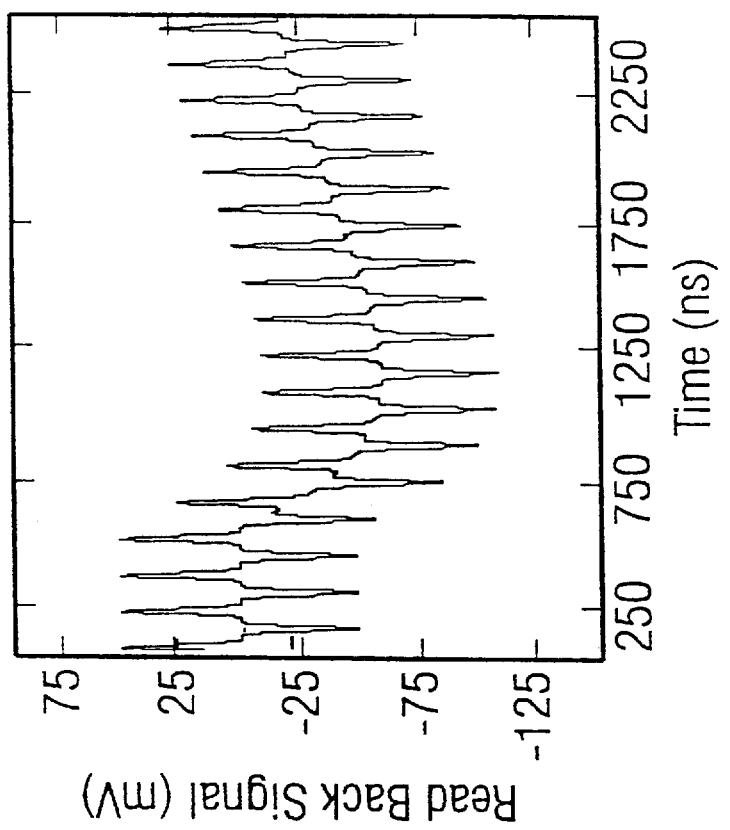
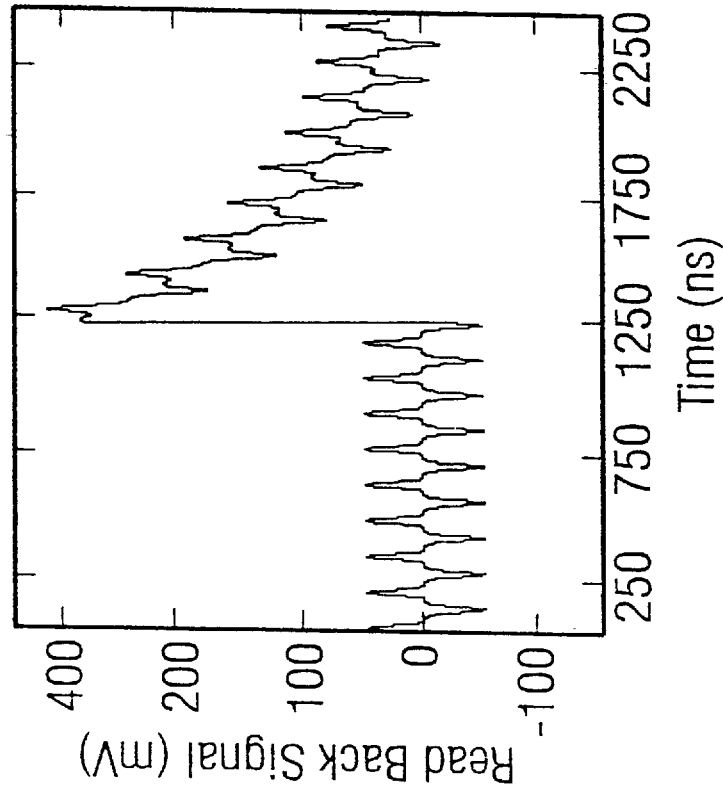

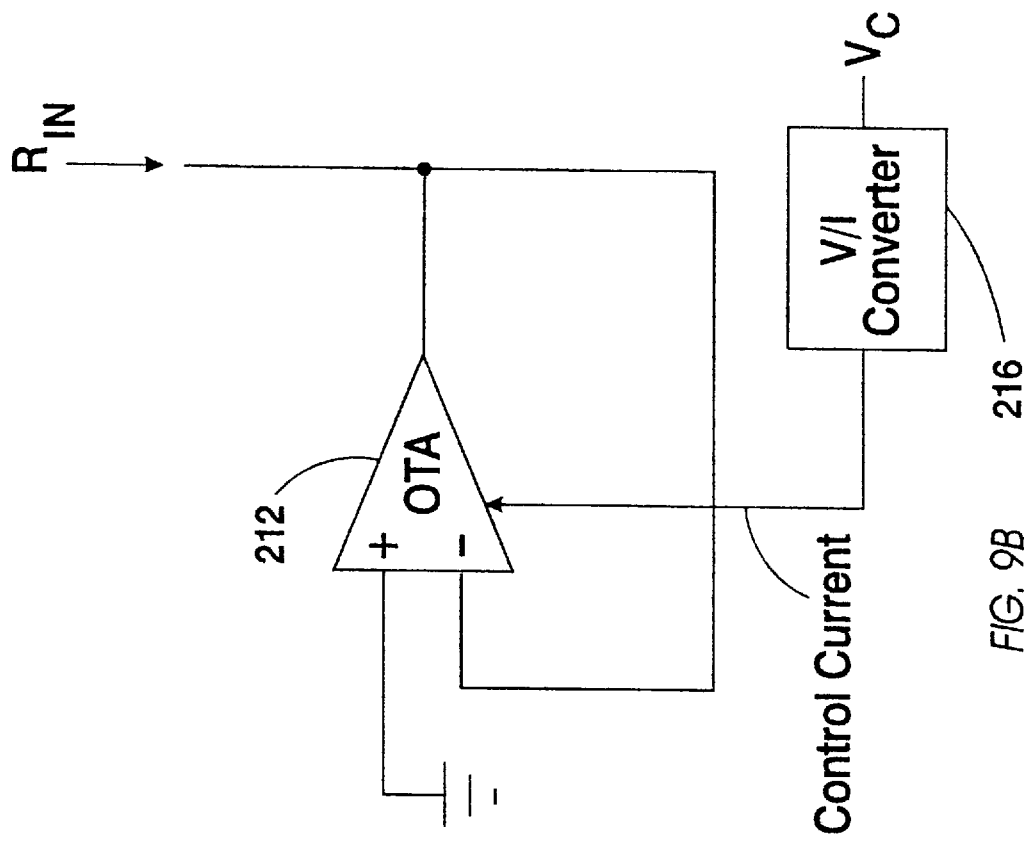
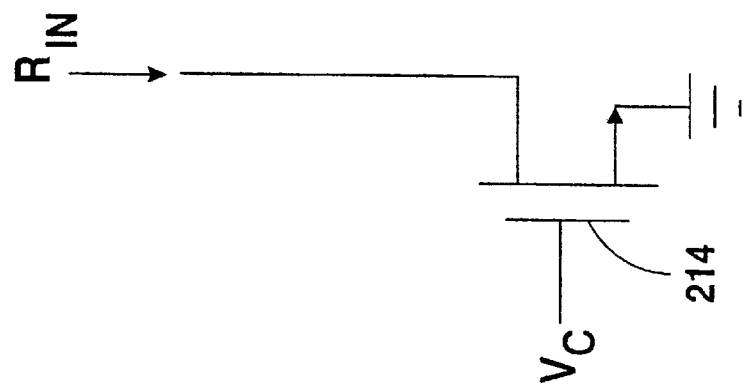
FIG. 9B
FIG. 9A

CIRCUITRY FOR CORRECTION OF THERMAL TRANSIENTS IN THE ANALOG SIGNAL FROM A MAGNETORESISTIVE SENSOR

TECHNICAL FIELD

This invention relates in general to magnetic recording systems that use magnetoresistive (MR) sensors for reading the magnetically recorded data, and in particular to circuitry that corrects the data signal from the MR sensor when the signal includes thermally-induced transients.

BACKGROUND OF THE INVENTION

An MR sensor detects magnetic field signals through the resistance changes of a magnetoresistive element, fabricated of a magnetic material, as a function of the strength and direction of magnetic flux being sensed by the element. MR sensors have application in magnetic recording systems because recorded data can be read from a magnetic medium when the external magnetic field from the recorded magnetic medium (the signal field) causes a change in the direction of magnetization in an MR read head. This in turn causes a change in electrical resistance in the MR read head and a corresponding change in the sensed current or voltage. The conventional MR sensor used in magnetic recording systems operates on the basis of the anisotropic magnetoresistive (AMR) effect in which a component of the element resistance varies as the square of the cosine of the angle between the magnetization in the element and the direction of sense or bias current flow through the element.

A different and more pronounced magnetoresistance, called giant magnetoresistance (GMR), has been observed in a variety of magnetic multilayered structures, the essential feature being at least two ferromagnetic metal layers separated by a nonferromagnetic metal layer. The physical origin is the same in all types of GMR structures: the application of an external magnetic field causes a variation in the relative orientation of the magnetizations of neighboring ferromagnetic layers. This in turn causes a change in the spin-dependent scattering of conduction electrons and thus the electrical resistance of the structure. The resistance of the structure thus changes as the relative alignment of the magnetizations of the ferromagnetic layers changes. A particularly useful application of GMR is a sandwich structure comprising two essentially uncoupled ferromagnetic layers separated by a nonmagnetic metallic spacer layer in which the magnetization of one of the ferromagnetic layers is "pinned", and thus prevented from rotating in the presence of an external magnetic field. This type of MR sensor is called a "spin valve" sensor. IBM's U.S. Pat. Nos. 5,159,513 and 5,206,590, describe MR spin valve sensors for use as MR read heads in magnetic recording data storage systems.

Disk drives are one type of magnetic recording data storage system that use MR read heads. MR disk drives use a rotatable disk with concentric data tracks containing the user data, a read/write head that includes an inductive write head and an MR read head for writing and reading data on the various tracks, a data readback and detection channel coupled to the MR head for processing the data magnetically recorded on the disk, an actuator connected to a carrier for the head for moving the head to the desired data track and maintaining it over the track centerline during read or write operations. There are typically a plurality of disks stacked on a hub that is rotated by a disk drive spindle motor. A housing supports the drive motor and head actuator and surrounds the head and disk to provide a substantially sealed environment for the head-disk interface. The head carrier is typically an air-bearing slider that rides on a bearing of air above the disk surface when the disk is rotating at its operational speed. The slider is maintained in very close proximity to the disk surface by a relatively fragile suspension that connects the slider to the actuator. The inductive write head and MR read head are patterned on the trailing end of the slider, which is the portion of the slider that flies closest to the disk surface. The slider is either biased toward the disk surface by a small spring force from the suspension, or is "self-loaded" to the disk surface by means of a "negative-pressure" air-bearing surface on the slider.

In the readback channels of magnetic recording systems that use MR heads, especially MR disk drives, thermally-induced transient errors occasionally appear in the data readback signal. One type of thermal transient is called a "thermal asperity" (TA) because it occurs when the MR head, or the portion of the slider near the MR head, makes momentary physical contact with the disk surface or a particle or "asperity" on the disk surface. During this asperity contact, friction generates heat, causing a sharp increase in the MR head temperature and a corresponding change in the MR head resistance. This thermally-induced resistance change is indistinguishable from a magnetically-induced resistance change, resulting in an error in the data readback signal. After the physical contact is broken or ceases, the heat injected diffuses away into the body of the slider, gradually reducing the MR head temperature (and thus the readback signal baseline) to its nominal value.

Another type of thermal transient that influences the MR head readback signal is "baseline wander", which is due to a variation in the thermal cooling of the MR head. This effect occurs when the slider body passes over an elevated portion of the disk, but does not necessarily contact it, in contrast to the case of a TA. One example of the cause of baseline wander is a worn down asperity that in the past gave rise to a TA. The momentary decrease in the slider flying height increases the heat flow from the heated MR head to the cooler disk surface, decreasing the MR head temperature. This creates slowly changing, negative excursions in the readback signal baseline.

The term "thermal asperity" is used to describe all types of thermal transients, including baseline wander, because disk asperities are the most common cause of the transients. Thus, the phrase "thermal asperity" as used herein is also meant to include any type of thermally-induced transient in the data signal from the MR read head, including both actual TAs and baseline wander.

Both thermal asperities (TAs) and baseline wander are thermal effects that introduce additive disturbances in the readback signal. These disturbances can be much larger in magnitude than the actual signal being read, resulting in saturated data signals and throwing off electronics in the readback channel.

One type of proposed remedy for TAs is to make use of the disk drive's data recovery procedure (DRP). When a TA is detected in the digital data, a DRP is initiated and the signal is read again by the MR head using a higher frequency high-pass filter to filter out some of the TA signal. In order to significantly reduce the TA signal, the high-pass filter must be set so high that the data channel just starts to make errors processing the low density data signals. The additional disadvantage of the DRP type of TA correction is that all DRP actions are visible to the user since one or more additional attempts to read the data are required.

Several techniques have been proposed for TA correction in the data readback channel after the data signal from the MR head has been digitized. These include digital filtering and freezing the gain loop of the variable gain amplifier (VGA) that outputs a constant amplitude signal to the digitizer. However, these techniques are not generally effective because they allow saturation of the VGA. These types of techniques for removing or reducing the effects of thermal asperities after the data signal has been digitized are described in IBM's U.S. Pat. No. 5,367,409; and by Galbraith et al. in "Magneto-Resistive Head Thermal Asperity Digital Compensation," *IEEE Transactions on Magnetics*, Vol. 28, No. 5, September 1992, pp. 2731–2732.

One technique for removing thermal transients due to actual thermal asperities from the analog data signal prior to digitization is described in IBM's U.S. Pat. Nos. 4,914,398 and 5,057,785. This technique utilizes a delay circuit to delay the analog data signal and a circuit to then reconstruct the actual thermal asperity signal, which is then subtracted out from the data signal during the delay. This technique is difficult and costly to implement into conventional MR head amplification circuitry because it requires accurate peak detection circuitry, additional on-chip real estate, and separate off-chip components.

There is thus a need to reliably and simply reduce the adverse effects of thermal asperities in an MR disk drive before the signal from the MR head is converted to digital data in the data readback channel.

SUMMARY OF THE INVENTION

The invention is detection/correction circuitry for correcting TAs in the analog signal output from a magnetoresistive sensor. In a disk drive with an MR head the circuitry is located between the MR head signal amplifier and the data readback channel so that the transients are corrected from the amplified analog data signal prior to processing of the analog data signal into digital data. The detection/correction circuitry substantially reduces the duration of TAs so that previously unrecoverable data errors can now be recovered by conventional error correction codes applied to the digital data. A TA detector comprises a low-pass filter that receives the analog data signal and an operational transconductance amplifier (OTA). The OTA has a dead zone for voltage levels between a negative and positive voltage threshold and generates an output current that is proportional to the difference between the low-pass filtered input signal and the threshold voltage. A TA correction circuit includes a high-pass filter that also receives the analog data signal and a filter pole adjust circuit connected to the high-pass filter. The pole adjust circuit is controlled by the output current from the OTA in the TA detector and supplies a control voltage to the high-pass filter that optimizes the filter pole frequency when a TA occurs. At the onset of the TA, the OTA's output current charges a capacitor in the pole adjust circuit, which raises the pole frequency of the high-pass filter and quickly brings the baseline of the analog data signal back to zero. When the baseline returns to within the OTA's dead zone, the OTA turns off. The capacitor in the pole adjust circuit then discharges quickly, for a first time period, through a diode and a first resistor until the diode turns off, after which the capacitor discharges more slowly, for a second time period, through a second resistor. This relatively quickly lowers the pole frequency of the high-pass filter to some elevated value, after which it decays more slowly. The break point between the fast decay and the slow decay is chosen to be the highest high-pass corner frequency for which the readback channel can still correctly read data. This TA detection/correction circuit thus quickly restores the baseline of the analog data signal to zero, quickly enables data to be read after the TA onset, and eliminates undershoot in the output signal due to the slowly changing tail of the TA. The TA detector can be located between the output of the high-pass filter and the input to the data readback channel or between the MR head signal amplifier and the high-pass filter, in which case the pole adjust circuit provides a predetermined feed forward control voltage to adjust the pole frequency of the high pass filter.

For a fuller understanding of the nature and advantages of the present invention, reference should be made to the following detailed description taken together with the accompanying figures.

BRIEF DESCRIPTION OF THE DRAWING

FIG. 4A illustrates a simulation of a thermal asperity type of thermal transient on the data signal from the MR read head.

FIG. 4B illustrates a simulation of the effect of a baseline wander type of thermal transient on the data signal from the MR read head.

FIG. 9A illustrates the preferred implementation for the variable resistance device used in the TA correction circuit of FIG. 8.

FIG. 9B illustrates an alternative implementation for the variable resistance device used in the TA correction circuit of FIG. 8.

DETAILED DESCRIPTION OF THE INVENTION

Prior Art

The present invention will be described and illustrated in terms of its application to magnetic recording rigid disk drives. However, the invention is also applicable to and can be implemented into other types of magnetic recording systems, such as tape drives, tape cassettes and flexible diskette drives. These types of data storage systems may also use MR read heads that sense magnetically recorded data from movable magnetic media.

Figure 1:
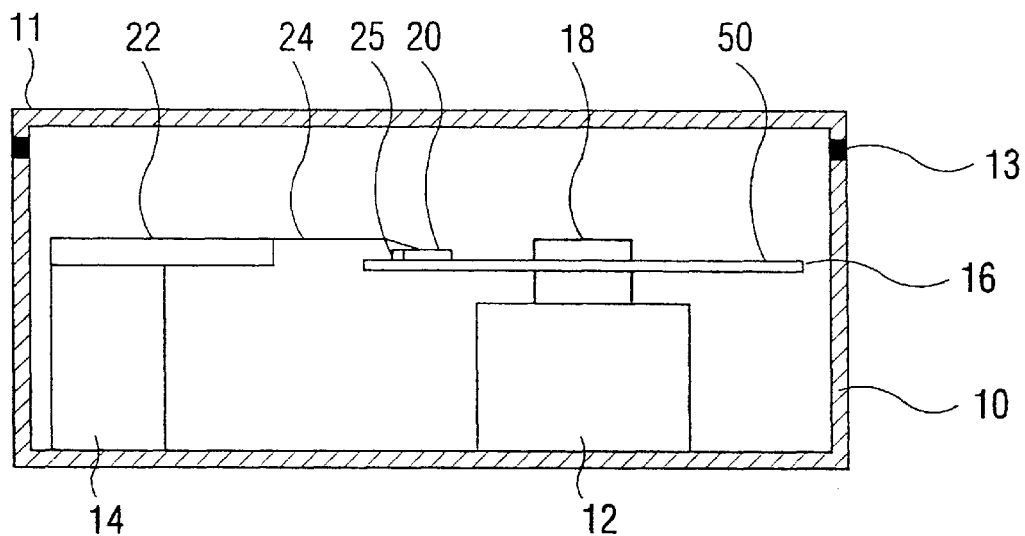
FIG. 1 is a simplified block diagram of a conventional magnetic recording disk drive with an MR read head.

A conventional magnetic recording disk drive that uses an MR sensor as the data read head is shown in FIG. 1. The disk drive comprises a base 10 to which are secured a disk drive motor 12 and an actuator 14, and a cover 11. The base 10 and cover 11 provide a substantially sealed housing for the disk drive. Typically, there is a gasket 13 located between base 10 and cover 11 and a small breather port (not shown) for equalizing pressure between the interior of the disk drive and the outside environment. A magnetic recording disk 16 is connected to drive motor 12 by means of hub 18 to which it is attached for rotation by the drive motor 12. A thin lubricant film 50 is maintained on the surface of disk 16. A read/write head or transducer includes an MR read element or head 25 and is formed on the trailing end of a carrier, such as an air-bearing slider 20. The read/write transducer also includes an inductive write element or head (not shown in FIG. 1). The slider 20 is connected to the actuator 14 by means of a rigid arm 22 and a suspension 24. The suspension 24 provides a biasing force that urges the slider 20 onto the surface of the recording disk 16. During operation of the disk drive, the drive motor 12 rotates the disk 16 at a constant speed, and the actuator 14, which is typically a linear or rotary voice coil motor (VCM), moves the slider 20 generally radially across the surface of the disk 16 so that the read/write head may access different data tracks on disk 16. As is well known in the art the MR read head reads not only the user data but also servo positioning information prerecorded on the disk, typically in servo sectors angularly spaced around the disk and located in the data tracks. The servo information is read and processed by a digital control system to control the amount of current sent to the VCM. In this manner the read/write transducer is maintained on track during read and write operations and accurately moved across the tracks to read and write on all the tracks.

Figure 2:
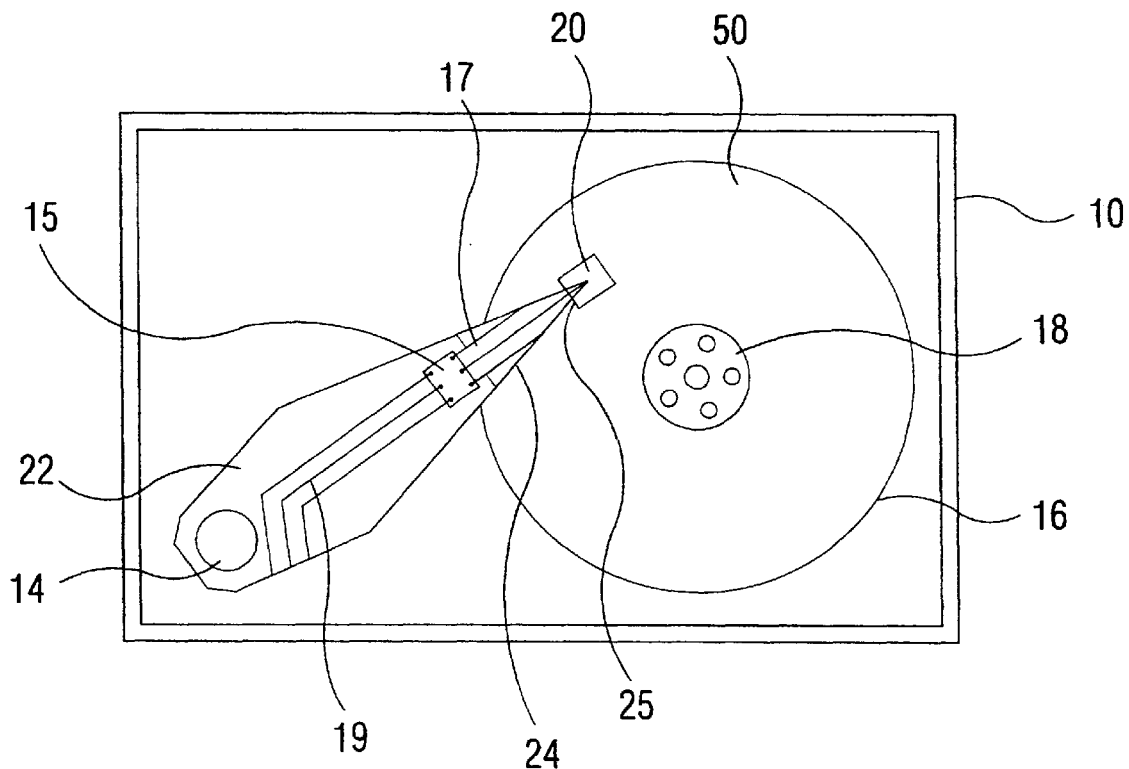
FIG. 2 is a top view of the disk drive of FIG. 1 with the cover removed.

FIG. 2 is a top view of the interior of the disk drive with the cover 11 removed, and illustrates in better detail the suspension 24 that provides a force to the slider 20 to urge it toward the disk 16. The suspension may be a conventional type of suspension such as the well-known Watrous suspension, as described in IBM's U.S. Pat. No. 4,167,765. This type of suspension also provides a gimbaled attachment of the slider which allows the slider to pitch and roll as it rides on the air bearing. The data detected from disk 16 by the MR read head 25 is processed into an analog data readback signal by signal amplification and processing circuitry in the integrated circuit module 15. The module 15 is placed close to the read/write transducer to keep the interconnections as short as possible. The module 15 is thus typically located on arm 22 and is referred to as the arm electronics (AE) module. The signal from MR read head 25 travels via flex cable 17 to AE module 15, which outputs the amplified data signal via cable 19 to a separate readback channel module, whose functions are shown and described below as channel 300 in FIG. 3.

The above general description of an MR disk drive is intended only to be representative. For example, disk drives may contain a number of disks and the actuator may support a number of sliders.

DESCRIPTION OF THE PREFERRED EMBODIMENTS

Location of TA Detection/Correction in MR Readback Data Channel

Figure 3:
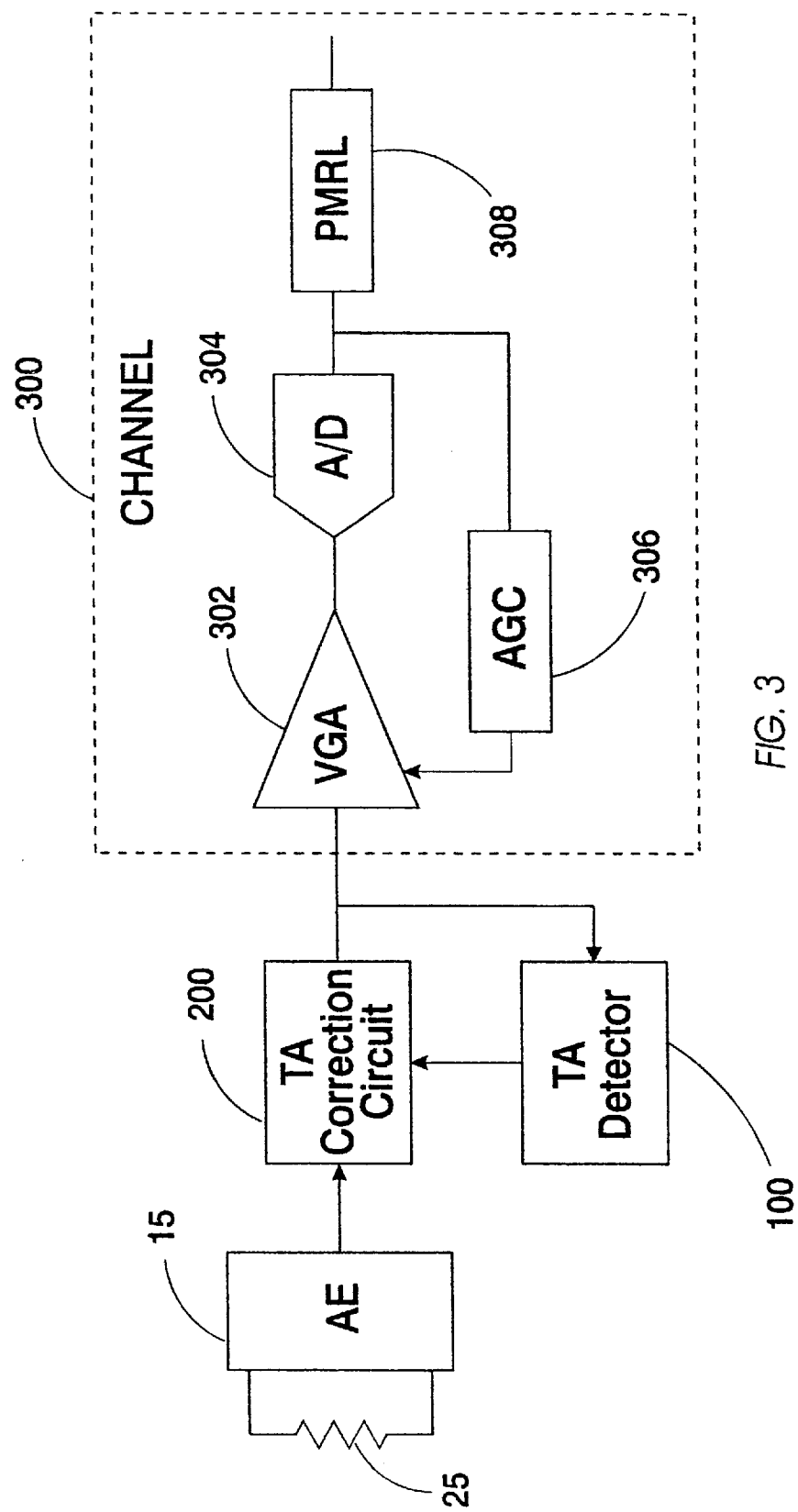
FIG. 3 is a block diagram of the present invention as incorporated into the signal path of an MR disk drive.

FIG. 3 is a block diagram illustrating the present invention as incorporated into the signal path of an MR disk drive. The invention includes a thermal asperity (TA) detector 100 and TA correction circuit 200 located between the AE module 15 and the readback channel 300.

Data stored as changes in magnetization on the disk 16 (FIG. 1) change the resistance of the MR read head 25 as the disk rotates past the head. This resistance change is detected and amplified in AE module 15. The analog signal from AE module 15 passes through TA correction circuit 200, which removes or reduces the effects of TA's in the data signal as a result of detection of a TA by detector 100. The TA correction circuit 200 allows data signals not containing TAs to pass through unaltered. The input to TA detector 100 can come from the output of the TA correction circuit 200, as shown in FIG. 3, or from the analog signal from AE module 15, as will be described later with respect to FIG. 14.

The output of the TA correction circuit 200 is connected to the input of the readback data channel 300. The analog input signal to channel 300 is first received by a variable gain amplifier (VGA) 302, which amplifies the signal such that the VGA output signal has a constant amplitude. The signal is then digitized by the A/D converter 304. This digitized signal from A/D converter 304 is processed by the automatic gain control circuitry (AGC) 306. AGC 306 detects the signal amplitude and controls the gain of VGA 302. The digitized signal from A/D converter 304 is also processed by a digital data detection module, shown in this embodiment as a partial-response maximum-likelihood (PRML) module 308, which generates the digital output data. The digital output from PRML module 308 is processed by conventional digital error correction circuitry (not shown) prior to passage of the data back to the host computer. The error correction circuitry uses well-known error correction codes (ECC) to recover errors in the digital data. While a PRML readback data channel is shown in FIG. 3, the present invention is also applicable to MR disk drives that use other readback data detection techniques, such as peak detection.

Effect of TAs and Baseline Wander on the Data Signal

An example of a TA superimposed on the data signal is shown in FIG. 4A, which is the simulated analog data signal before and after a TA (the TA occurs at 1250 nanoseconds). The amplified analog data signal from the AE module 15 is a series of positive and negative voltage pulses about a nominal baseline voltage level. Typically the peak-to-peak voltage of the data signal is in the range of approximately 100 mV. For any one particular disk drive the amplitude of the voltage pulses are generally fixed and do not vary by more than approximately 20% during normal operation. However, from disk drive to disk drive the amplitude of the pulses can vary by a factor of approximately 3. As shown in FIG. 4A, in the case of a TA the data signal and the TA baseline disturbance are additive. The TA consists of a rapid increase in the signal baseline, followed by a negatively decaying tail back to the nominal baseline. The tail decays exponentially determined by the heat diffusion into the material and slider body surrounding the MR head. It is desirable to be able to detect and correct for any TA, either actual TA voltage "spikes" or baseline wander, that causes the baseline voltage level of the data signal to vary by more than approximately 25% of the nominal baseline to peak signal amplitude.

FIG. 4B is a simulation of the effect of baseline wander type of thermal transient on the readback signal (the baseline wander commences at approximately 500 nanoseconds). Baseline wander creates slowly changing, negative excursions in the signal baseline. The change in baseline signal due to baseline wander is much more gradual than during a TA event, as can be seen by comparing FIG. 4B with FIG. 4A.

The TA Detector

Figure 5:
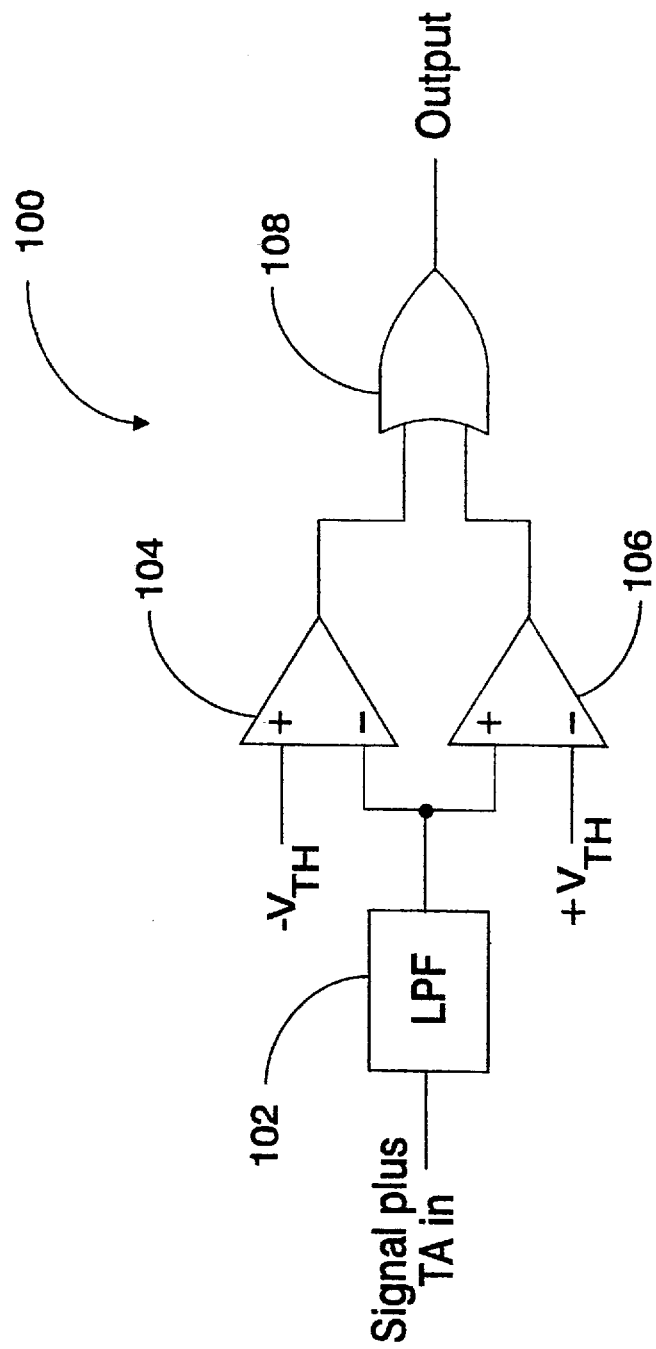
FIG. 5 is a conceptual block diagram of the TA detector according to the present invention.

FIG. 5 shows a conceptual block diagram of the TA detector 100 according to the present invention. The detector is a low-pass filter/window comparator detector with a fixed threshold. The input signal containing data plus occasional TAs is filtered by a low-pass filter (LPF) 102. The function of the LPF 102 is to filter out much of the data signal while passing through the TA signal. Typically the LPF 102 would filter everything above approximately 2 MHz. The filtered signal from LPF 102 is received by a window comparator comprised of two comparators 104 and 106. During a TA event, the signal baseline will shift, and the output of LPF 102 will change in either the positive or negative direction, depending on the sign of the TA. When the filtered signal amplitude from LPF 102 is more positive than a predetermined positive threshold voltage, $+V_{TH}$, or more negative than this threshold, $-V_{TH}$, one of the comparator 104, 106 outputs will become a high logic level. A logical OR gate 108 combines the comparator 104, 106 outputs to a single output that is high during a TA. The rising edge of the OR gate 108 output indicates the onset of a TA. The value of the threshold voltage $V_{TH}$ and the LPF 102 pole frequency are chosen such that data signals not containing TAs will not cause the output of OR gate 108 to go high.

Figure 6:
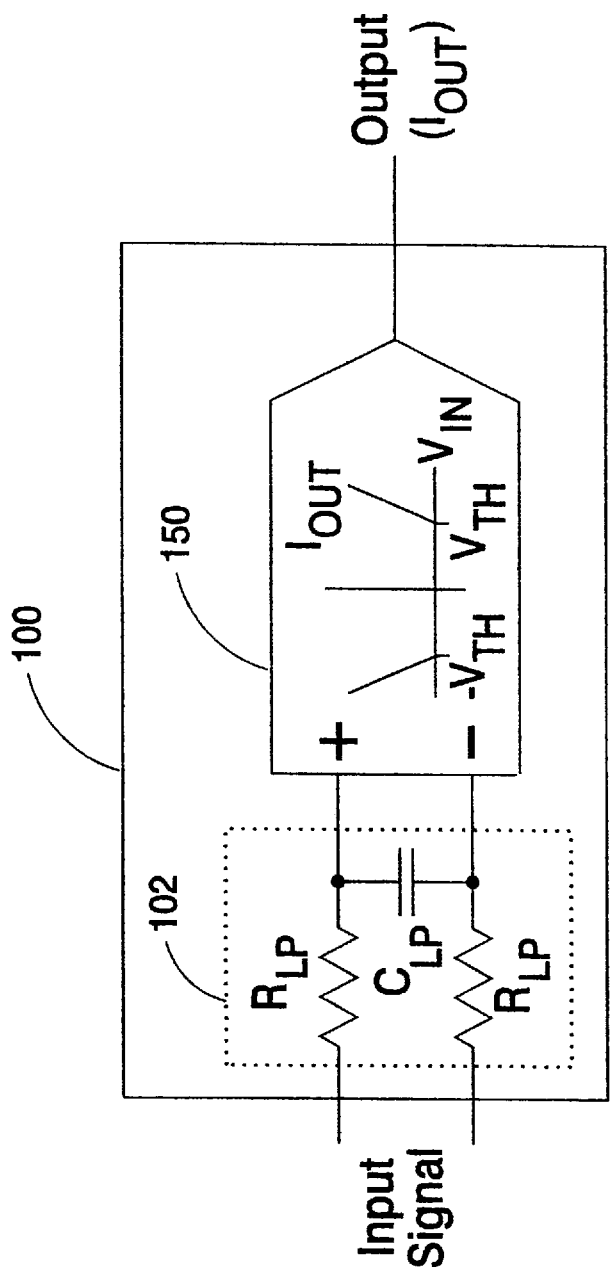
FIG. 6 shows the preferred embodiment of the TA detector with a low-pass filter and a dead zone operational transconductance amplifier.

FIG. 6 shows the preferred embodiment of the TA detector 100. The LPF 102 is a passive first order differential RC circuit. The detection thresholding is performed by a rectifying operational transconductance amplifier (OTA) 150, which has a dead zone for signal voltage level inputs between the negative and positive threshold voltage $V_{TH}$. The OTA 150 output current, $I_{OUT}$, is zero for normal data signals and is positive during TA events and baseline wander of either polarity. The OTA 150 output current $I_{OUT}$ is proportional to the difference between the filtered input signal and the threshold voltage $V_{TH}$. To adjust the threshold voltage value (for a different range of signal amplitudes or data rates), either the dead zone threshold is adjusted, or the LPF 102 pole frequency is changed. However, due to offset and noise considerations, it is preferable to keep the dead zone threshold constant and adjust the pole frequency.

Figure 7:
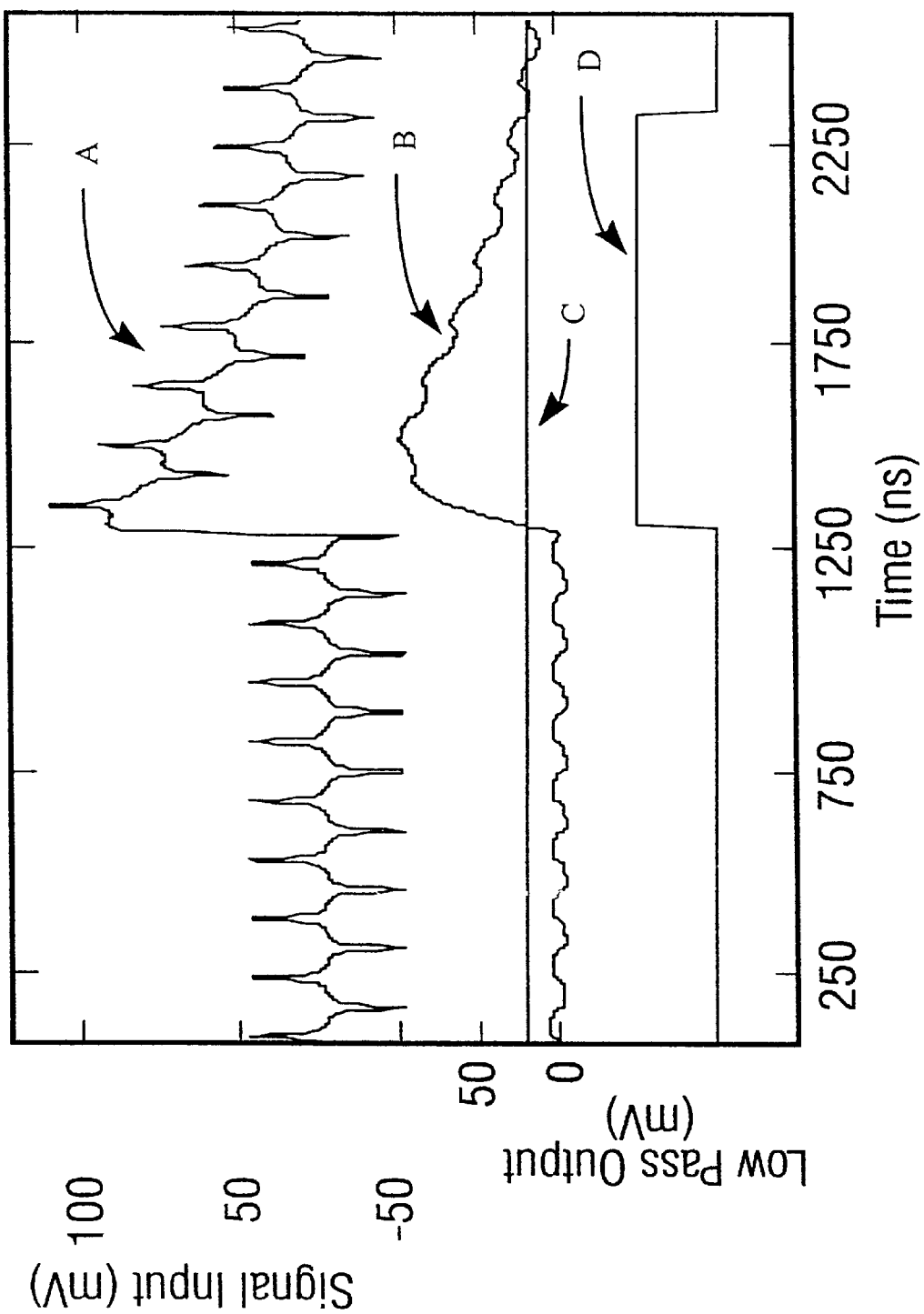
FIG. 7 shows the waveforms present in various portions of the TA detector before and during a TA event.

FIG. 7 shows the waveforms present in the TA detector 100 before and during a TA event. Curve A shows the input analog data signal with the TA, curve B is the output of LPF 102, curve C is the positive threshold voltage $V_{TH}$, and curve D is the output signal from OTA 150. At the beginning of the signal, there is no TA present, so the filtered signal is below $V_{TH}$ and the OTA 150 output (curve D) is zero. At time 1250 nanoseconds, a TA occurs. Soon thereafter the filtered signal from LPF 102 (curve B) exceeds $V_{TH}$ and the OTA 150 output goes high, indicating the onset of a TA. When the signal baseline returns to its nominal value, the filtered signal from LPF 102 drops below $V_{TH}$ and the OTA 150 output goes low, indicating the end of the TA.

The TA Correction Circuit

Figure 8:
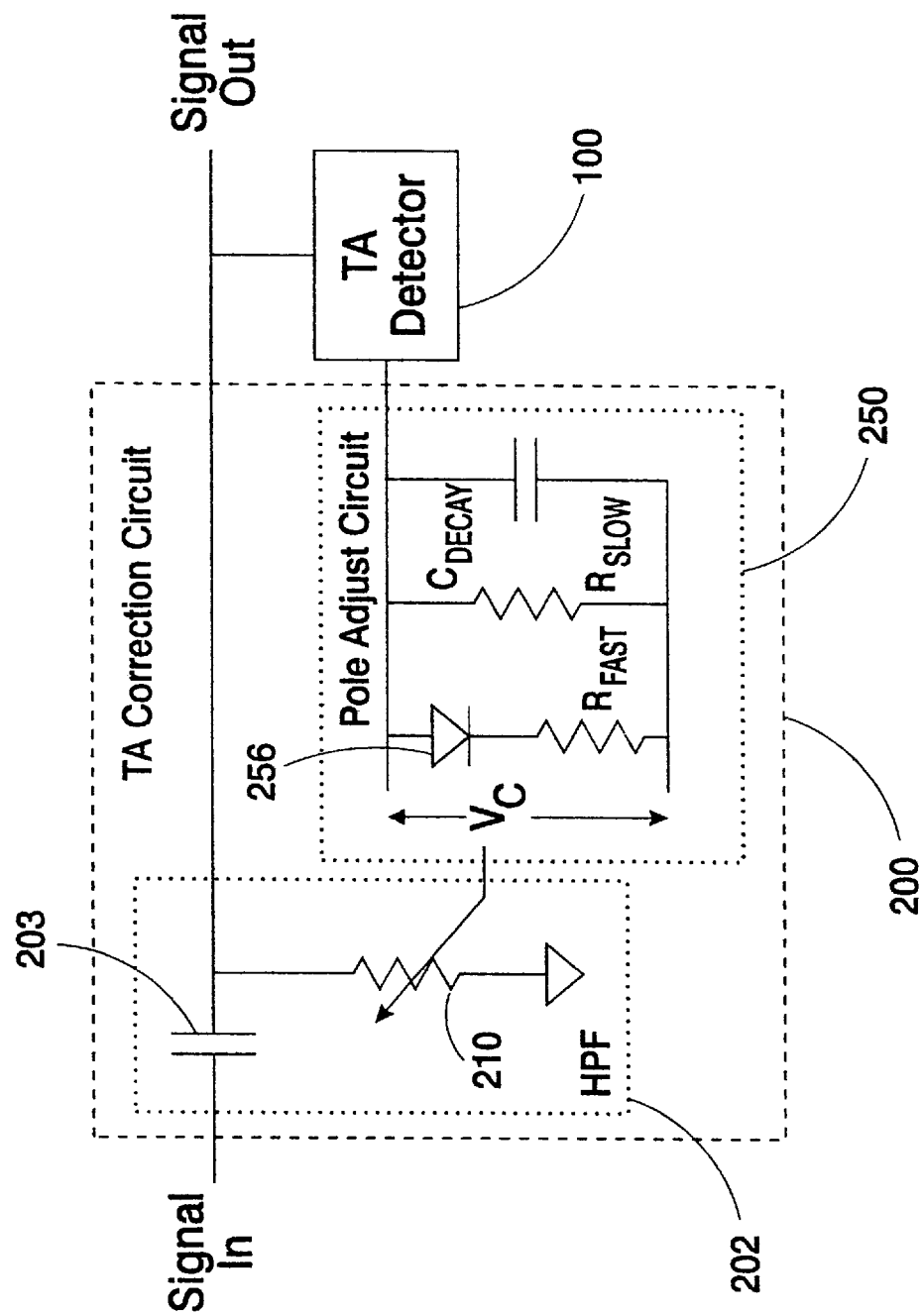
FIG. 8 is a block diagram of the TA correction circuit according to the present invention showing its connection to the TA detector.

FIG. 8 shows a block diagram of the TA correction circuit 200 and its connection to TA detector 100 in the preferred embodiment. The analog data signal from AE module 15 is input to TA correction circuit 200 and passes through a first order high-pass filter (HPF) 202, shown as a capacitor 203, and a variable resistance device, represented as a variable resistor 210 in FIG. 8. Typically the HPF 202 will filter everything below approximately 1 MHz. By adjusting the resistance value of resistor 210, the HPF 202 pole frequency can be varied. The HPF 202 is designed so that the pole frequency can be varied from approximately 1 MHz to 15 MHz, which will allow for the correction of any TA causing the nominal baseline voltage level of the head signal to increase or decrease by more than approximately 25%. The output of the HPF 202 is monitored by the previously described TA detector 100 (FIG. 6). Upon detection of a TA, the TA detector 100 sends a signal to pole adjust circuit 250. The pole adjust circuit 250 outputs a control voltage, $V_C$, to variable resistor 210. This increases the pole frequency of HPF 202 by altering the resistance of resistor 210. By increasing the filter pole frequency, the signal baseline is restored to its normal value more quickly, thus reducing the effect of a TA. Once the baseline is restored to normal, the TA detector 100 turns off, and the pole adjust circuit 250 decreases the pole to its nominal frequency.

FIGS. 9A and 9B show two possible implementations for the variable resistor 210 in the TA correction circuit 200 of FIG. 8. The first and preferred implementation (FIG. 9A) is the use of a metal-oxide semiconductor field-effect transistor (MOSFET) 214 as the variable resistor. For small input signals, the conductance ($1/R_{IN}$) looking into the MOSFET drain is roughly proportional to a control voltage $V_C$ applied to the gate. The control voltage for MOSFET 214 is the output of pole adjust circuit 250 (FIG. 8). A junction FET can be used instead of the MOSFET.

An alternative implementation (FIG. 9B) for the variable resistor 210 is an operational transconductance amplifier (OTA) 212 constructed in a unity gain configuration with the input grounded. The resistance $R_{IN}$ looking into the output of OTA 212 is equal to the reciprocal of the OTA 212 transconductance. This resistance $R_{IN}$ can be scaled in a straightforward manner with an external control current, which establishes the bias current in the OTA 212 input stage and thus sets the transconductance. Since the voltage output $V_C$ of pole adjust circuit 250 is used to control the OTA 212, a voltage-to-current converter 216 is provided between pole adjust circuit 250 and the control current input to OTA 212.

Figure 10:
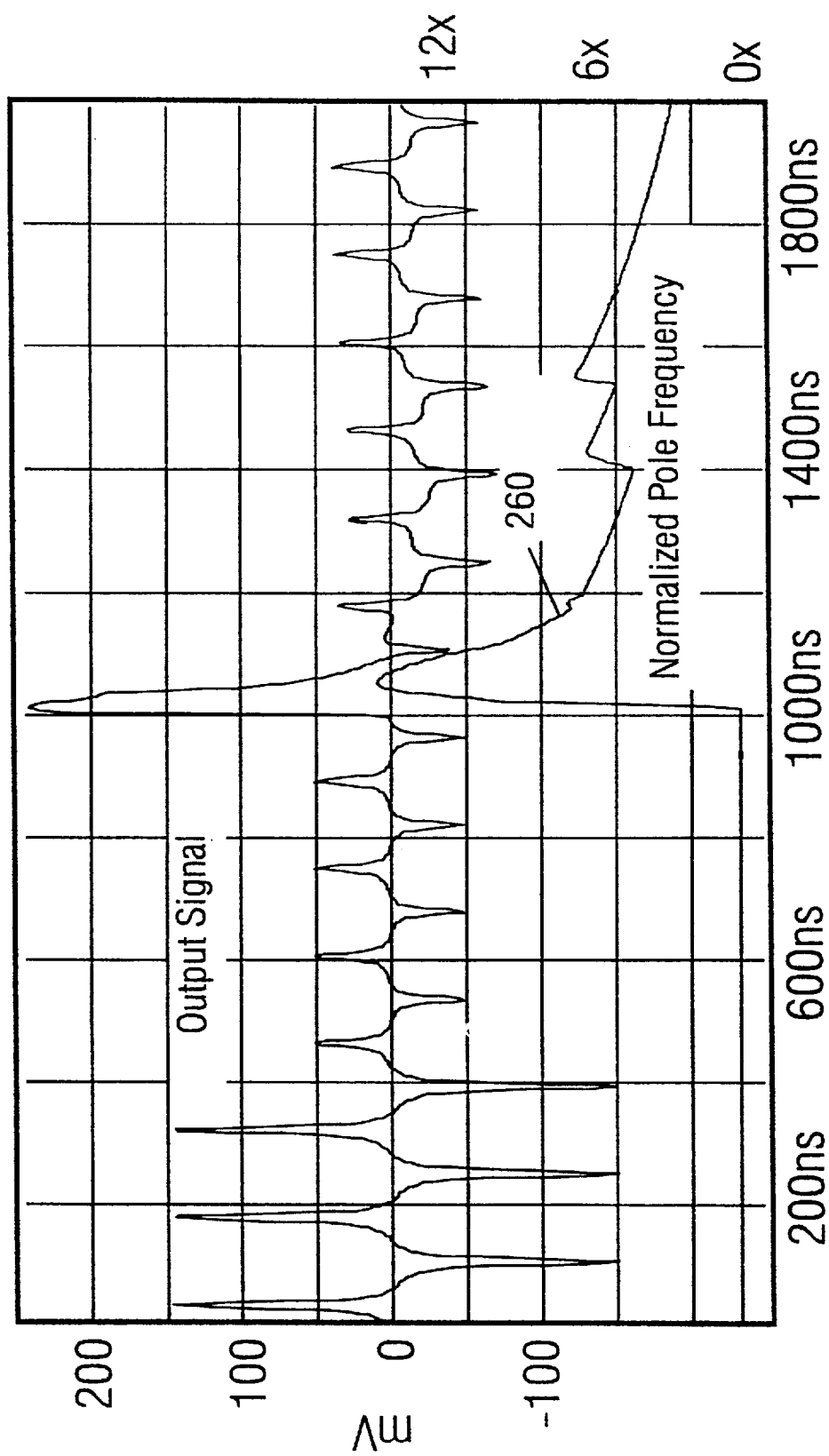
FIG. 10 is a simulation of the output data signal from the TA correction circuit compared with the normalized pole frequency of the pole of the high-pass filter in the TA correction circuitry.

The preferred implementation of the pole adjust circuit is shown within the block 250 in FIG. 8. The input to pole adjust circuit 250 is the current output of TA detector 100, specifically the current $I_{OUT}$ from OTA 150 (FIG. 6). The output of circuit 250 is a voltage that is used as the control voltage $V_C$ for the variable resistor 210. The pole frequency of the HPF 202, comprised of capacitor 203 and variable resistor 210, is proportional to the output voltage $V_C$ of the pole adjust circuit 250. The pole adjust circuit 250 optimizes the location of the HPF 202 pole frequency during a TA event. At the onset of the TA, the TA detector 100 outputs current $I_{OUT}$, which charges the capacitor $C_{DECAY}$, raising the pole frequency and quickly bringing the signal baseline back to zero. Once the signal baseline returns to within the TA detector 100 dead zone, the OTA 150 of TA detector 100 turns off, and $C_{DECAY}$ discharges quickly, for a first time period, through diode 256 and resistor $R_{FAST}$ until the diode 256 turns off. Then $C_{DECAY}$ discharges more slowly, for a second time period, through resistor $R_{SLOW}$. This relatively quickly lowers the pole frequency of HPF 202 to some elevated value (e.g., 8 times nominal) after which it decays more slowly. The break point between the fast decay and the slow decay is chosen to be the highest high-pass corner frequency for which the readback channel can still correctly read data. This correction circuit 200 thus performs three important tasks. It quickly restores the signal baseline to zero, quickly enables data to be read after the TA onset, and eliminates undershoot in the output signal due to the slowly changing tail of the TA. This operation is demonstrated in the simulation shown in FIG. 10. The top trace (and left scale) in FIG. 10 is the output signal from the TA correction circuit 200 that is input to the readback channel chip 300 (FIG. 3). The bottom trace (and right scale) is the normalized pole frequency of the HPF 202. Several transitions of a 3× amplitude input signal are included at the beginning of the simulated signal to show that the circuit is not falsely triggered. The pole decay breakpoint between the fast decay and the slow decay is set at 8× the nominal frequency, as shown as item 260 in FIG. 10.

Figure 11:
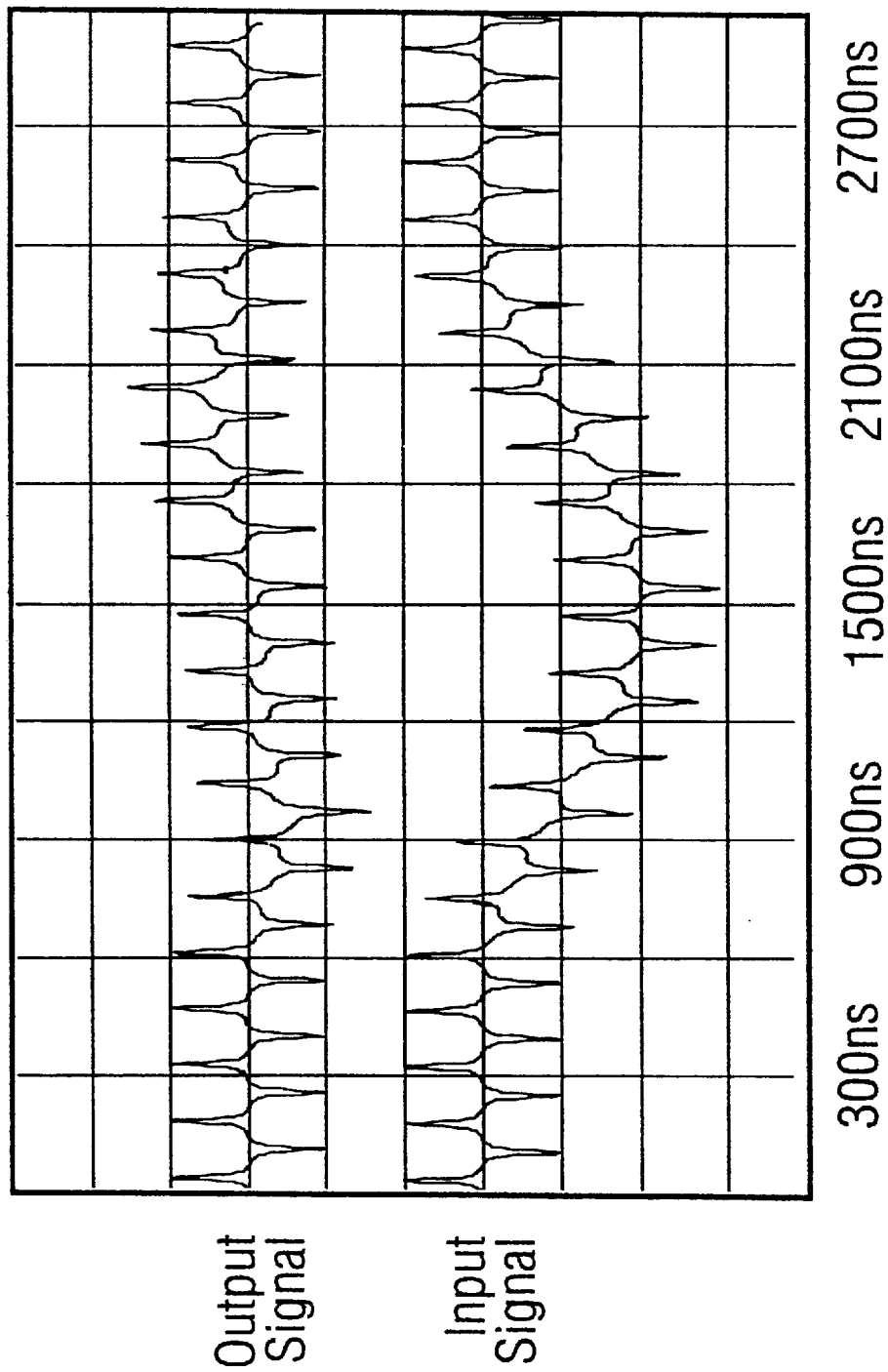
FIG. 11 is a simulation of the output of the TA correction circuit in response to a head signal with baseline wander.

Since TAs are a more common occurrence than baseline wander in the data readback signal from an MR head in a disk drive, the TA correction circuit is optimized to respond to TAs. Nevertheless, the circuit is still quite effective at reducing baseline wander, as is shown in FIG. 11. The input signal with simulated baseline wander of 2× the normal signal amplitude is shown in the bottom trace, and the correction circuit output signal is shown in the top trace. In this simulation, the data error was reduced from 98 bits to zero by TA correction circuit 200.

Figure 12:
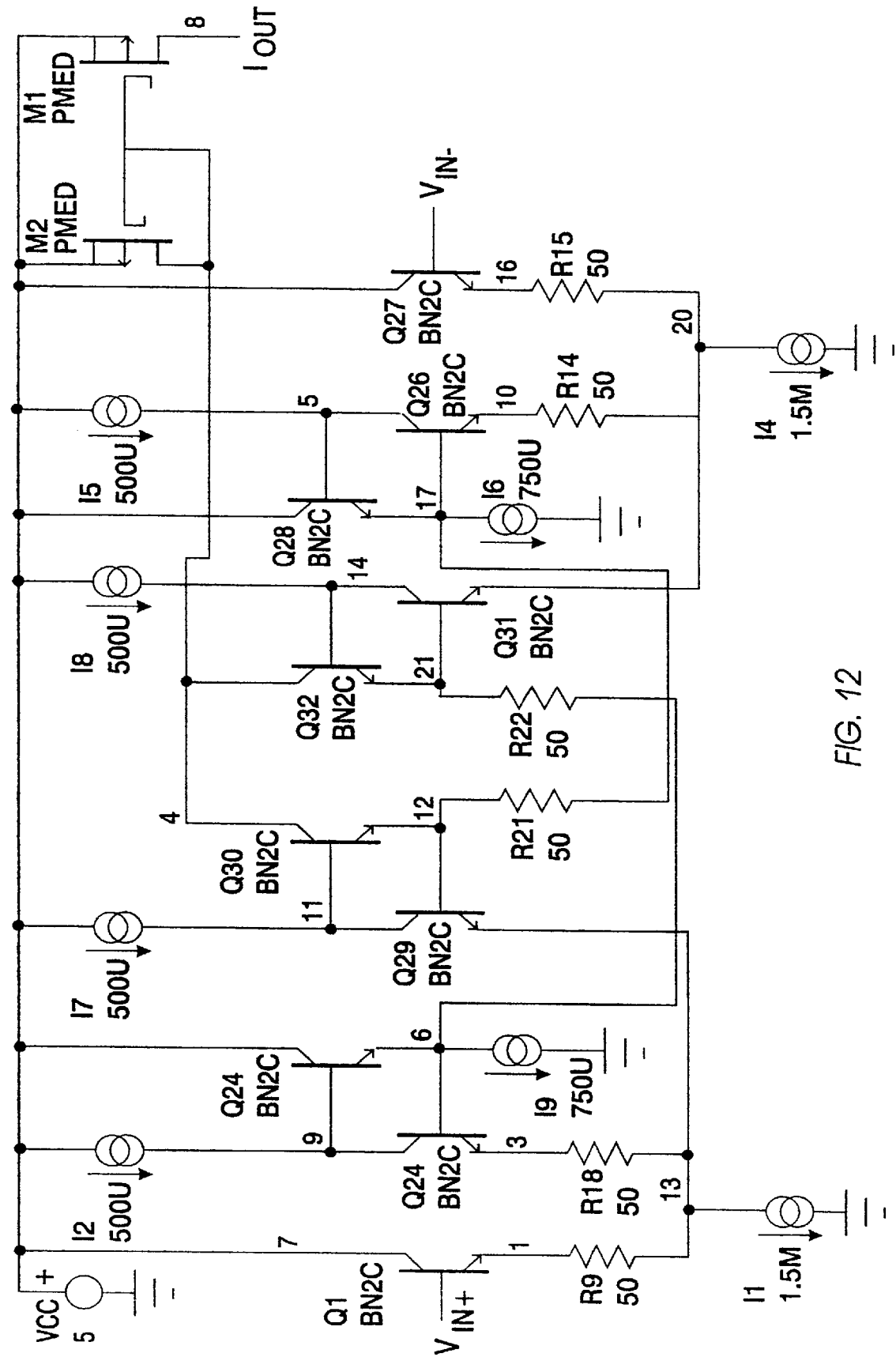
FIG. 12 is a detailed schematic for the preferred embodiment of the dead zone operational transconductance amplifier shown in the TA detector of FIG. 6.

The thermal asperity event signal, $I_{OUT}$, from TA detector 100 is the input to pole adjust circuit 250. FIG. 12 shows the detailed schematic for the preferred embodiment of the dead zone OTA 150 in the TA detector 100 (FIG. 6) that generates $I_{OUT}$. It is voltage-in, current-out device that rectifies and has a well-controlled dead zone. The dead zone is set by the following equation:

$$V_{TH} = \pm(I_1 * R_9).$$

When the input voltage $(V_{IN+} - V_{IN-})$ is larger than $V_{TH}$, the slope of the transfer curve is given by:

$$G_m = 1/R_{21}.$$

Active voltage followers track the input voltages (node 6 follows $V_{IN+}$, node 17 follows $V_{IN-}$). Active followers also follow the input signals offset by the voltage drop across the emitter degeneration resistors (nodes 12, 21). When the differential input is less than $V_{TH}$, $Q_{30}$ and $Q_{32}$ are both off and the output current is zero. When the input exceeds the threshold, $Q_{30}$ or $Q_{32}$ turns on and the voltage $V_{IN} - V_{TH}$ appears across $R_{21}$ or $R_{22}$, generating an output current $I_{OUT}$ for the pole adjust circuit 250 (FIG. 8).

Referring again to FIG. 3, it may be desirable in certain sytems to include a signal amplitude clipping circuit at the output of the TA correction circuit 200. This will prevent the data signal from exceeding the range of VGA 302. It may also be possible to use an amplitude clipping circuit as the TA correction circuit. In such an arrangement, when a TA is detected the TA detector 100 would cause the clipping level to be decreased. This type of TA correction would not perform as well as TA correction circuit 200 described above because the data signal to the channel 300 would be distorted. However, the PRML block 308 may be able to recover the digital data from the distorted signal.

Alternative Embodiments

Figure 13:
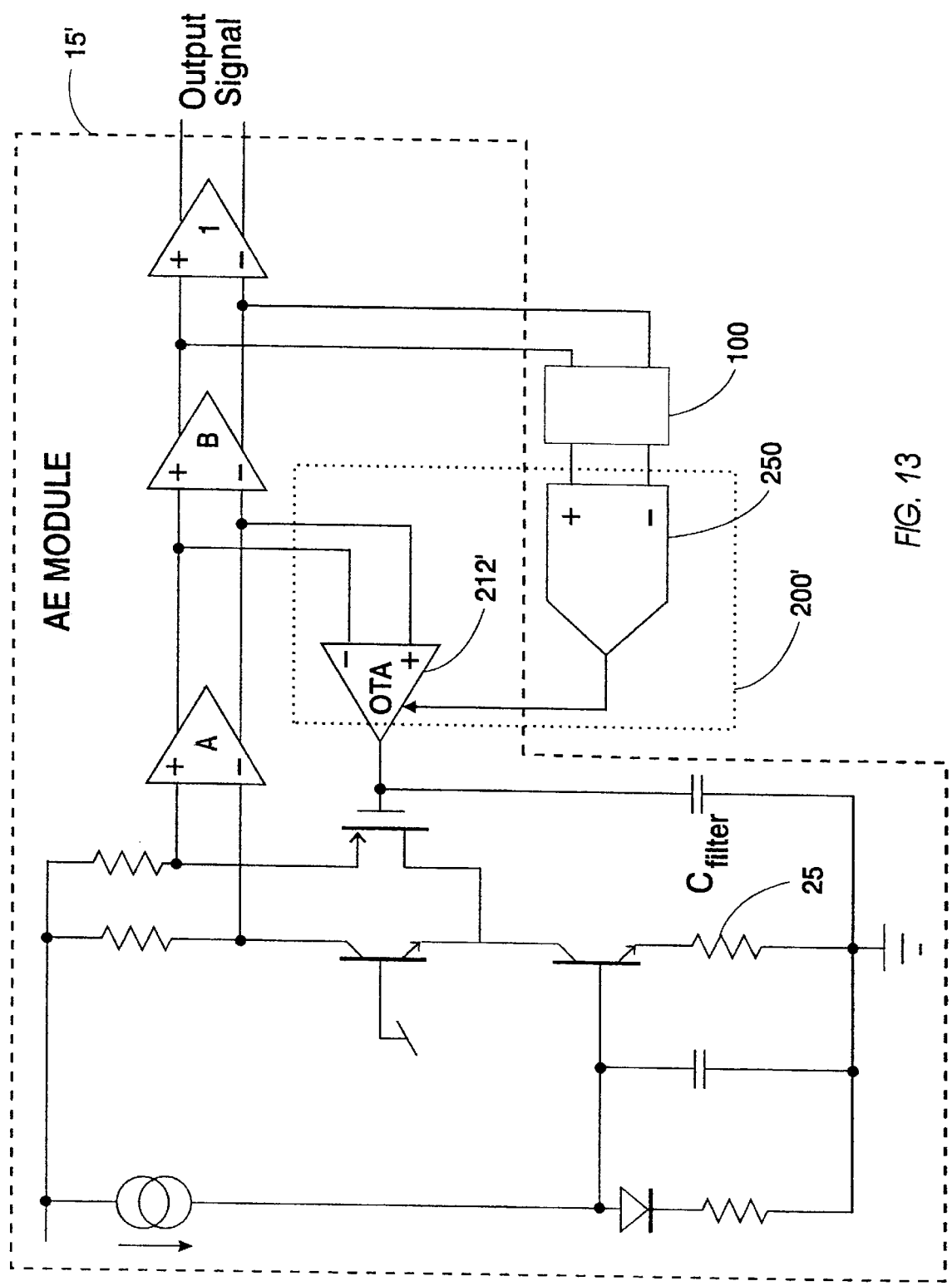
FIG. 13 is a schematic of an alternative implementation of the TA correction circuitry that uses existing components of the head amplification circuitry.

FIG. 13 shows an alternative implementation of TA correction circuit 200' that makes use of existing circuitry in an AE module 15' of the type that uses a voltage bias MR read circuit employing an OTA for offset correction. This embodiment can be explained by comparing FIG. 13 with FIG. 8 and by considering the variable resistor 210 to be the implementation of FIG. 9B. The OTA 212' is normally present in the AE module to create a high-pass filtered response to the sensor signal. By increasing the transconductance of the existing OTA 212', the high-pass pole frequency can be increased. The OTA 212' in AE module 15 thus functions like the variable resistor implementation of FIG. 9B. The TA detector 100 and pole adjust circuit 250 to control the pole location complete the circuit.

Figure 14:
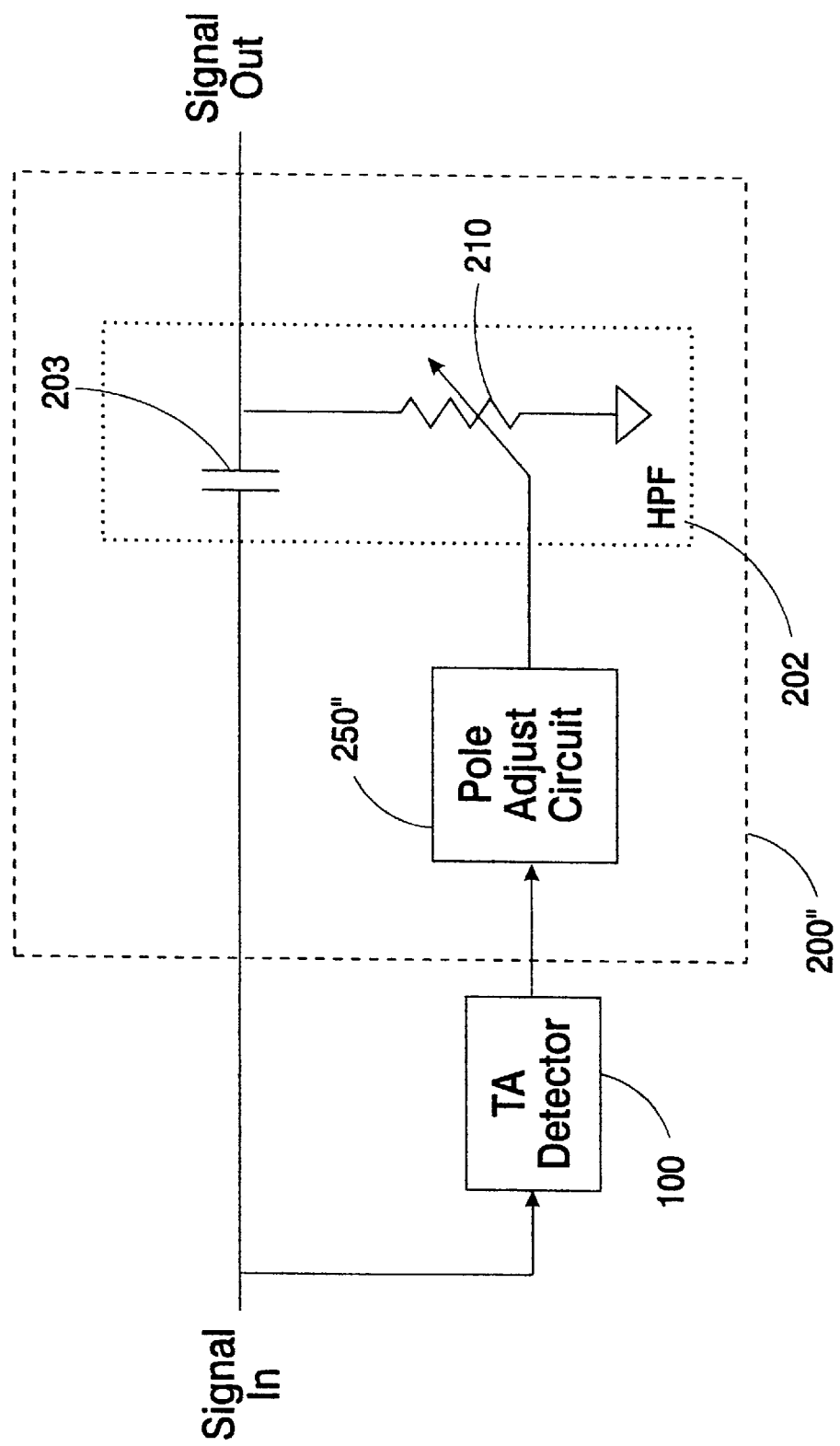
FIG. 14 is a block diagram of an alternative implementation of the TA correction circuitry according to the present invention using a feed forward approach.

FIG. 14 shows a second alternative implementation of the TA correction circuit 200", where the input to the TA detector 100 is taken before instead of after the HPF 202. This topology is feed forward correction rather than the preferred feed back correction described above. Upon receipt of a TA event signal from TA detector 100, the pole adjust circuit 250" moves the pole of HPF 202 in a predetermined manner, for example to a high value of approximately 10:1 its nominal pole frequency, for a short period of time, for example approximately 100 nanoseconds, and then to a lower value, approximately 4:1, for approximately 1 microsecond.

The TA detection and correction circuitry in all the above-described embodiments of the invention can be incorporated into a separate integrated circuit chip located between the AE module and the readback channel chip. Alternatively, the circuitry can be included into the AE module.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A magnetic recording system comprising:
   a magnetic recording medium;
   a magnetoresistive head for generating a signal in response to magnetic fields from the medium, the head signal being affected by changes in temperature of the head and comprising generally analog positive and negative voltage pulses of a generally fixed amplitude about a nominal baseline voltage level and thermal transients that alter the nominal baseline voltage level;
   data readback channel circuitry coupled to the head for converting the analog signal from the head to digital data;
   thermal transient detection circuitry having an input for the head signal and located between the head and the data readback channel circuitry for generating a thermal transient event signal in response to a detected thermal transient in the head signal; and
   signal correction circuitry located between the head and the data readback channel circuitry for correcting the head signal containing thermal transients, the signal correction circuitry comprising a high-pass filter having an input for the head signal and a variable pole setting, and pole adjust circuitry responsive to a thermal transient event signal from the thermal transient detection circuitry for adjusting the pole of the high-pass filter; whereby the analog signal from the head contains substantially no thermal transients when received by the data readback channel.

2. The system according to claim 1 wherein the magnetic recording medium is a disk having data magnetically recorded on it, the system further comprising:
   a motor connected to the disk for rotating the disk;
   a carrier for supporting the head and maintaining the head in close proximity to the disk so the head can detect magnetic fields from the magnetically recorded data on the disk; and
   an actuator for moving the carrier generally radially across the disk so the head can access different regions of magnetically recorded data on the disk.

3. The system as in claim 1 wherein the thermal transient is a voltage spike having an amplitude that causes the nominal baseline voltage level of the head signal to increase by at least twenty-five percent of the base to peak signal amplitude.

4. The system as in claim 3 wherein the voltage spike is a thermal asperity event caused by the head carrier contacting the disk.

5. The system as in claim 1 wherein the thermal transient is a wander of the baseline voltage from its nominal level without any voltage pulses having amplitudes substantially greater than the generally fixed amplitude voltage pulses in the head signal.

6. The system as in claim 1 wherein the input for the high-pass filter of the signal correction circuitry is located between the head and the input to the thermal transient detection circuitry.

7. The system as in claim 1 wherein the input for the high-pass filter of the signal correction circuitry is located between the input to the thermal transient detection circuitry and the data readback channel.

8. The system as claim 1 wherein the high-pass filter comprises a capacitor and a variable resistance device, the variable resistance device being coupled to the pole adjust circuitry.

9. The system as in claim 8 wherein the pole adjust circuitry provides an output voltage and wherein the variable resistance device is a field-effect transistor having its gate controlled by the pole adjust circuitry output voltage.

10. The system as in claim 8 wherein the pole adjust circuitry provides an output voltage, wherein the variable resistance device is an operational transconductance amplifier constructed in a unity gain configuration with its input grounded, and further comprising a voltage-to-current converter located between the pole adjust circuitry and the operational transconductance amplifier for providing a control current to the operational transconductance amplifier.

11. The system as in claim 1 further comprising head signal amplification circuitry located between the head and the correction circuitry, the head signal amplification circuitry including an operational transconductance amplifier, and wherein the pole adjust circuitry is coupled to the operational transconductance amplifier in the head signal amplification circuitry for providing a control current to the operational transconductance amplifier in the head signal amplification circuitry.

12. The system as in claim 1 wherein the thermal transient event signal from the thermal transient detection circuitry is a current output, and wherein the pole adjust circuitry comprises a capacitor that is charged by the current output from the thermal transient detection circuitry, a first resistor and diode in series through which the capacitor discharges during a first time period, and a second resistor through which the capacitor discharges during a second time period, the voltage across the capacitor providing a control voltage to control the pole setting of the high-pass filter.

13. The system as in claim 1 wherein the thermal transient detection circuitry comprises a low-pass filter for receiving the head signal and passing substantially only thermal transients from the input head signal and a threshold detector for providing a thermal transient event signal when the output of the low-pass filter is greater than a predetermined positive threshold voltage or less than a predetermined negative threshold voltage.

14. The system as in claim 13 wherein the threshold detector is a dead zone operational transconductance amplifier whose dead zone is the voltage range between said positive and negative threshold voltages.

15. The system as in claim 1 further comprising magnetoresistive head amplification circuitry between the magnetoresistive head and the head signal correction circuitry for amplifying the signal from the head.

16. The system as in claim 1 further comprising signal amplitude clipping circuitry located between the output of the signal correction circuitry and the data readback channel.

17. A magnetic recording disk drive comprising:
a magnetic recording disk;
a motor connected to the disk for rotating the disk;
a magnetoresistive head for generating an analog signal in response to magnetic fields, the head signal being affected by changes in temperature of the head;
a head signal amplifier coupled to the head for amplifying the signal from the head, the amplified head signal comprising generally analog positive and negative voltage pulses of a generally fixed amplitude about a nominal baseline voltage level and thermal asperity voltage spikes that alter the nominal baseline voltage level;
a carrier supporting the head and maintaining the head in close proximity to the disk so the head can detect magnetic fields from the magnetically recorded data on the disk;
an actuator for moving the carrier generally radially across the disk so the head can access different regions of magnetically recorded data on the disk;
data readback channel circuitry for receiving the amplified head signal and comprising a variable gain amplifier and an analog-to-digital converter for digitizing the output from the variable gain amplifier;
thermal asperity voltage spike detection circuitry having an input for the amplified head signal and located between the head signal amplifier and the variable gain amplifier for generating a thermal asperity event signal representative of the difference between the thermal asperity voltage spike and a predetermined threshold; and
signal correction circuitry located between the head signal amplifier and the input to the thermal asperity voltage spike detection circuitry for correcting the amplified head signal containing thermal asperity voltage spikes, the signal correction circuitry comprising a variable high-pass filter having a variable resistance device for adjusting the high-pass filter's pole frequency and pole adjust circuitry responsive to a thermal asperity event signal from the thermal asperity voltage spike detection circuitry for supplying a control voltage to the variable resistance device; whereby the amplified analog signal from the head contains substantially no thermal asperity voltage spikes when received by the variable gain amplifier in the data readback channel.

18. A disk drive as in claim 17 wherein the variable resistance device is a field-effect transistor having its gate controlled by the control voltage from the pole adjust circuitry.

19. A disk drive as in claim 17 wherein the thermal asperity event signal from the thermal asperity voltage spike detection circuitry is a current output, and wherein the pole adjust circuitry comprises a capacitor that is charged by the current output from the thermal asperity voltage spike detection circuitry, a first resistor and diode in series through which the capacitor discharges during a first time period, and a second resistor through which the capacitor discharges during a second time period, the voltage across the capacitor providing the control voltage for the variable resistance device.

20. A disk drive as in claim 17 wherein the thermal asperity voltage spike detection circuitry comprises a low-pass filter for receiving the amplified head signal and passing substantially only thermal asperity voltage spikes from the input amplified head signal and a threshold detector for providing a thermal asperity event signal when the output of the low-pass filter is greater than a predetermined positive threshold voltage or less than a predetermined negative threshold voltage.

21. A disk drive as in claim 17 wherein the threshold detector is a dead zone operational transconductance amplifier whose dead zone is the voltage range between said positive and negative threshold voltages.

22. Electrical circuitry for detection and correction of thermal transients in an analog signal generated by a magnetoresistive sensor, the analog signal being generally a series of positive and negative voltage pulses of a generally fixed amplitude about a nominal baseline voltage level and thermal transients that alter the nominal baseline voltage level, the circuitry comprising:

thermal transient detection circuitry comprising a low-pass filter for receiving the analog signal and passing substantially only the thermal transients from the analog signal and a threshold detector for providing a thermal transient event signal representative of the difference between the output of the low-pass filter and a predetermined threshold voltage;

a high pass filter having a variable pole setting and an input for the analog signal for correcting the analog signal containing thermal transients; and pole adjust circuitry responsive to a thermal transient event signal from the thermal transient detection circuitry for adjusting the pole of the high-pass filter; whereby the analog signal from the head contains substantially no thermal transients when output by the high pass filter.

23. The circuitry as claim 22 wherein the high-pass filter comprises a capacitor and a variable resistance device, the variable resistance device being coupled to the pole adjust circuitry.

24. The circuitry as in claim 23 wherein the pole adjust circuitry provides an output voltage and wherein the variable resistance device is a field-effect transistor having its gate controlled by the pole adjust circuitry output voltage.

25. The circuitry as in claim 23 wherein the pole adjust circuitry provides an output voltage, wherein the variable resistance device is an operational transconductance amplifier constructed in a unity gain configuration with its input grounded, and further comprising a voltage-to-current converter located between the pole adjust circuitry and the operational transconductance amplifier for providing a control current to the operational transconductance amplifier.

26. The circuitry as in claim 22 wherein the thermal transient event signal from the thermal transient detection circuitry is a current output, and wherein the pole adjust circuitry comprises a capacitor that is charged by the current output from the thermal transient detection circuitry, a first resistor and diode in series through which the capacitor discharges during a first time period, and a second resistor through which the capacitor discharges during a second time period, the voltage across the capacitor providing a control voltage to control the pole setting of the high-pass filter.

27. The circuitry as in claim 22 wherein the threshold detector is a dead zone operational transconductance amplifier whose dead zone is a voltage range between predetermined positive and negative threshold voltages.

28. The circuitry as in claim 22 further comprising magnetoresistive sensor amplification circuitry for amplifying the signal from the sensor before the signal is input to the thermal transient detection circuitry.

29. A magnetic recording system comprising:

a magnetic recording medium;

a magnetoresistive head for generating a signal in response to magnetic fields from the medium, the head signal being affected by changes in temperature of the head and comprising generally analog positive and negative voltage pulses of a generally fixed amplitude about a nominal baseline voltage level and thermal transients that alter the nominal baseline voltage level;

data readback channel circuitry coupled to the head for converting the analog signal from the head to digital data;

thermal transient detection circuitry having an input for the head signal and located between the head and the data readback channel circuitry for generating a current output representing a thermal transient event signal in response to a detected thermal transient in the head signal; and signal correction circuitry located between the head and the data readback channel circuitry for correcting the head signal containing thermal transients, the signal correction circuitry comprising a high-pass filter having an input for the head signal and a variable pole setting, and pole adjust circuitry for adjusting the pole of the high-pass filter, the pole adjust circuitry comprising a capacitor that is charged by the current output from the thermal transient detection circuitry, a first resistor and diode in series through which the capacitor discharges during a first time period, and a second resistor through which the capacitor discharges during a second time period, the voltage across the capacitor providing a control voltage to control the pole of the high-pass filter; whereby the analog signal from the head contains substantially no thermal transients when received by the data readback channel.

* * * * *